United States Patent [19]
Hubby

[11] 3,763,706
[45] Oct. 9, 1973

[54] METHOD AND APPARATUS FOR DETERMINING A FLUID CONTAMINANT

[75] Inventor: Laurence M. Hubby, Bellaire, Tex.

[73] Assignee: Texaco Inc., New York, N.Y.

[22] Filed: Apr. 2, 1971

[21] Appl. No.: 130,690

[52] U.S. Cl. .................................. 73/452, 73/61.1 R
[51] Int. Cl. ........................... G01n 9/00, G01n 9/36
[58] Field of Search ................ 73/61.1 R, 32, 445, 73/447, 448, 451, 452, 453

[56] References Cited
UNITED STATES PATENTS
3,222,928 12/1965 Walker .............................. 73/53 X FOREIGN PATENTS OR APPLICATIONS
450,333 8/1948 Canada ................................. 73/452

Primary Examiner—James J. Gill
Attorney—Thomas H. Whaley and Carl G. Ries

[57] ABSTRACT

A U-tube arrangement has a float on the inlet leg level of fluid therein. The outlet leg has a predetermined discharge level, and the float actuates an alarm to indicate when oil appears in the inlet leg.

7 Claims, 1 Drawing Figure

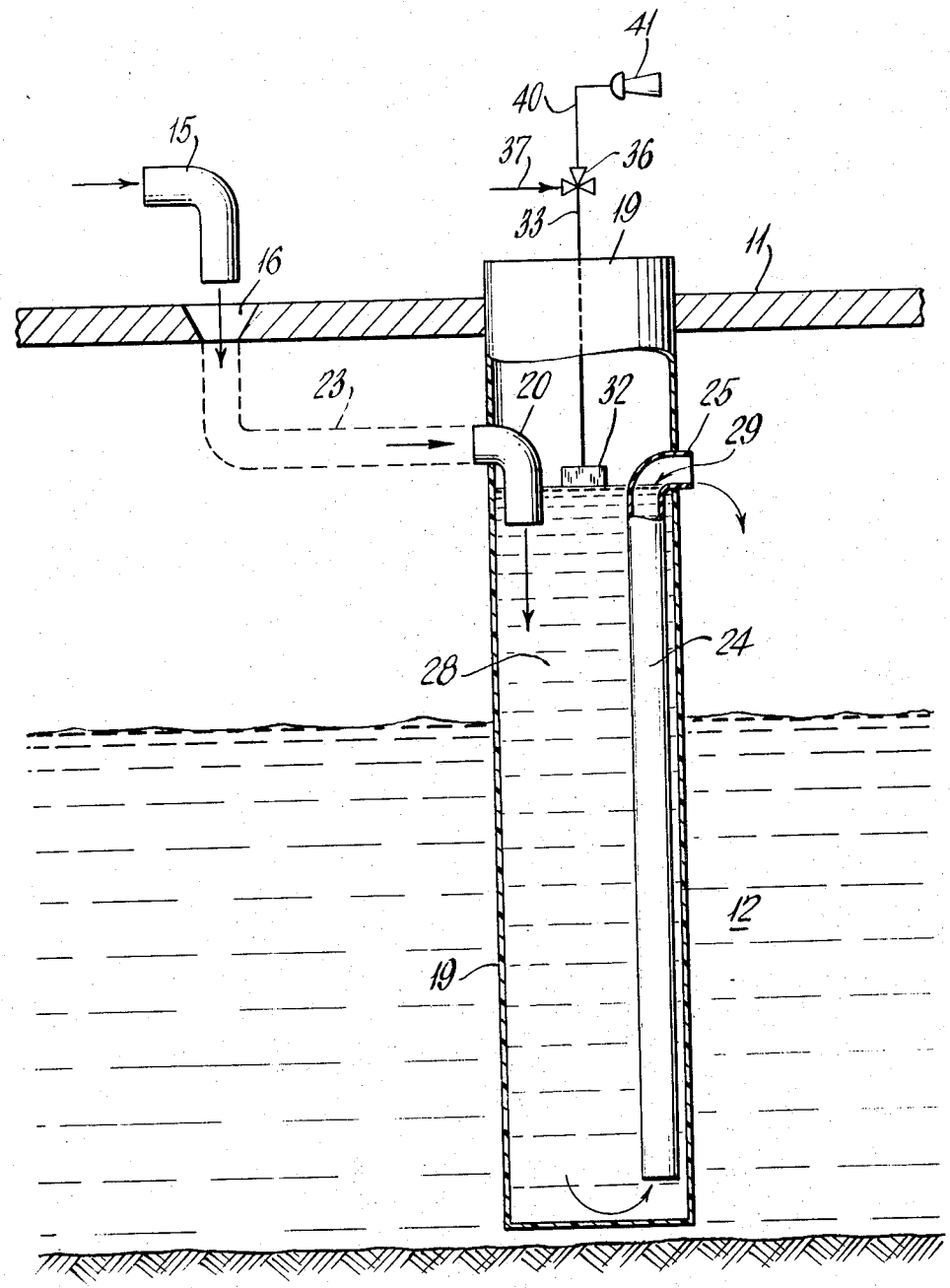

METHOD AND APPARATUS FOR DETERMINING A FLUID CONTAMINANT

BACKGROUND OF THE INVENTION

1. Field of the Invention

This invention relates in general to a method and apparatus for detecting a contaminating fluid. More specifically, it concerns a system for detecting a contaminating fluid that has a different density from the uncontaminated fluid.

2. Description of the Prior Art

While there have been various ways devised for detecting the presence of a contaminating fluid, none of these has relied upon the use of an old and well-known principle that is involved in a fluid U-tube. In the case where a contaminating fluid has a density that is different from the density of the contaminated fluid, the U-tube principle lends itself to determining the presence of the comtaminating fluid in one leg of a U-tube with an overflow on a leg containing the uncontaminated fluid.

SUMMARY OF THE INVENTION

Briefly, the invention is a method of sensing the presence of a contaminant in a liquid stream. The contaminant is one that has a different specific gravity from that of said stream. The method comprises the steps of connecting a U-tube to said stream with a fixed height outlet leg, and sensing the height of the inlet leg of said U-tube. It also comprises the step of determining a change in said inlet height which is indicative of the presence of said contaminant in said liquid stream.

Again, briefly, the invention is a combination of elements that are in use with petroleum product operations which have a platform structure located over or near a body of water. The said structure includes a deck upon which oil may gather, and a drain for carrying off fluids from said deck. The elements that are in combination are an elongated cylindrical container having a closed bottom and forming the inlet of a U-tube, and a conduit within said container extending down near the bottom of and open for fluid connection with the fluid in said container. The said conduit passes through a side wall of said container with a fluid-tight joint and forms the outlet leg of said U-tube. The combination also includes means for connecting said drain to said elongated container above said outlet joint, and a float located in said container on the surface of the fluid in said inlet leg. It also comprises a pneumatic valve, an alarm actuated by penumatic control, and means for supplying pneumatic pressure to said valve and connecting said alarm to said valve. Finally, it also comprises means for connecting said float to said valve for actuating same to cause actuation of said alarm whenever the steady-sate fluid level in said container rises above the steady-state discharge level from said outlet leg, which indicates the presence of oil in the fluid draining from said deck.

BRIEF DESCRIPTION OF THE DRAWING

The foregoing and other objects and benefits of the invention will be more fully set forth below in connection with the best mode contemplated by the inventor of carrying out the invention, and in connection with which there are illustrations provided in the drawing, wherein:

The FIGURE of drawing illustrates schematically, by an elevation partly in cross-section, the principal elements of a structure and system for carrying out the invention.

DESCRIPTION OF THE PREFERRED EMBODIMENTS

In connection with petroleum operations, there often is some type of structure that is offshore in a body of water (such as an ocean or lake). Or, it might be located close to some such body of water, so that any spill or discharge of oil will tend to create undesirable contamination of the water.

Such structure will usually have a deck above which considerable equipment is located, and on which various operations will be carried out. Consequently, it is usual to provide some drain arrangement for carrying off surface water from rain or from washing operations or the like. And, the drain fluid is discharged into the body of water.

However, if there should be any oil spillage, or otherwise oil or a similar contaminant should appear in the drain from the deck, it is most desirable to detect such oil presence in the drainage from the deck so as to be able to take steps for avoiding contamination of the body of water into which such drainage would flow.

While the specific illustration of this invention relates to oil or other petroleum product that is lighter than water, it will be appreciated that a contaminating fluid which has a density greater than water would also be subject to detection in the use of this invention. It would merely mean that the reverse effect of level difference would be created.

Referring now to the FIGURE of the drawing, it is pointed out that there is illustrated a deck or platform member 11 that is supported by other structure (not shown) so as to be located over or near a body of water 12. The body of water 12 would, of course, be contaminated by introduction of oil or similar petroleum products if they should be released from the structure supporting the platform 11.

For example, a tank battery would often be mounted on a supporting structure over the ocean, or similar body of water. Such a tank battery usually would include a treater (not shown) for removing contaminants such as oil or oil emulsions before they are discharged from the treater. In the illustration, such discharge would be out through a pipe 15 which is related to the treater. From there, the discharge fluid would go into a drain hole 16 in the deck 11, for discharge into the body of water 12.

Of course, any other water on the deck 11 would also tend to flow out through the drain hole 16. Consequently, if there should be oil spillage, or other contaminating fluid on the deck 11, it would also flow out through the drain hole 16.

In order to detect the presence of oil or other contaminant in the drainage from the deck 11 (from whatever source), there is an elongated cylindrical container 19 that has a closed bottom and includes an inlet elbow or pipe 20 which passes through the side wall of the container 19. The joint between the walls of the container and the pipe 20 is made fluid-tight so that the level of fluid inside container 19 may rise above the joint without any leakage. The outside end of the elbow 20 is connected for fluid flow from the drain hole 16 by any feasible tube or pipe 23. This pipe or tube 23 is shown in dashed lines in order to indicate that it might take various forms, including a flexible hose or the like.

Inside the container 19, there is a conduit 24 that has fluid-tight, or impervious walls. It extends from close to the bottom of container 19 up to some predetermind height above the body of water 12, so that fluid discharging through the conduit 24 may flow directly (or indirectly) into the body of water 12. It is to be noted that the joint between the conduit 24 and the wall of the container 19 (i.e., where an elbow 25 of the conduit 24 passes through the walls of the container 19) forms a fluid-tight joint, in a similar manner as the inlet elbow 20.

The structure described thus far creates or forms a U-tube for fluid that flows through from the pipe or inlet 20 and out the outlet or elbow 25. Such U-tube has an inlet leg formed by a body of fluid 28 in the container 19, the effective height of which is the distance between the surface of the fluid 28 in the body of the container 19 and the open lower end of the conduit 24. The outlet leg of the U-tube is formed by a fluid column 29 which is inside the conduit 24. It will be noted that the surface of the inlet leg 28 tends to be at the same height or equal level as the surface of the outlet leg or column 29, so long as the fluid in both legs has equal density. And, when the instrument is first put in operation, it will be filled with treater discharge water so as to bring the level of the outlet leg up to the top or discharge level.

If the density of the fluid in the inlet leg 28 is greater or less than the density of the fluid in column 29, there will be an equilibrium condition, under static or steady-state flow, that has the level of the inlet leg 28 above or below that for the column 29. In the case of oil, or similar petroleum products, the density of inlet leg 28 would be less than that of the column 29 so that the level of the inlet leg 28 would be higher than that of the column 29. The latter is, of course, determined by the discharge level thereof.

There is a float 32 that is supported by its buoyancy on the surface of the inlet leg, i.e., fluid column 28. This float 32 has some type of connecting mechanism or structure which has been indicated schematically by a line 33 in the drawing. The line 33 mechanism is connected to, for actuating a pneumatic valve 36. There is a source (not shown) of pneumatic pressure located on the supporting structure, and it supplies presure to a pneumatic line which is indicated by an arrow 37. This provides pneumatic pressure to an inlet port of the valve 36 so that when the valve is actuated by a change in the height of the float 32, it will apply pneumatic pressure to an alarm 41 via pneumatic connection 40.

It will be appreciated that the pneumatic valve 36 could be replaced by an electric switch (not shown) if desired. In such case the alarm 41 would, of course, be an electric horn. Also, under these circumstance the pneumatic line 37 would be replaced by an electrical circuit connection.

METHOD

The method according to this invention may be clarified with reference to the specific structure illustrated and in connection with the following steps thereof. However, it will be understood that the various steps might be carried out with different types and forms of apparatus which are not necessarily the mere mechanical equivalent of the elements illustrated in the drawing.

Thus, a method according to this invention relates to sensing the presence of a contaminant in a liquid stream. Such contaminant is one having a different specific gravity, or density, from that of the stream. The method steps include the following:

1. Connecting a U-tube to the stream with a fixed effective height outlet leg. This involves the location of U-tube structure having any feasible form, and being so located as to have an adequate or desirable height of fluid legs. Also, the outlet or discharge from the outlet leg is so located as to be at a predetermined or fixed height above the high water level. In other words, by attaching the container 19 to the deck 11 of the structure it will fix the vertical location of the outlet or elbow 25 of the outlet leg 29 of the U-tube structure. Consequently, whenever the level of fluid 28 exceeds that of the bottom of the elbow 25, it will flow out and fall or be discharged into the main body of water 12. This, then, fixes or determines the height of the U-tube outlet leg.

2. The step of sensing the height of the inlet leg of the U-tube. This step may be carried out with various different structural arrangements which need not be mechanically equivalent to one another. The illustrated way of carrying out this step involves the use of a float (such as the float 32) carried on the surface of the inlet leg of the U-tube fluid. Therefore, when the level varies this float will follow and vary its vertical location. Such fluid level sensing could, of course, be carried out in many other and different ways, such as by employing light reflection from the surface of the liquid in leg 28, etc. However, in the illustrated arrangement the sensing is done by having a mechanical connection between the float 32 and the pneumatic valve 36. The valve will be actuated when the float position changes.

3. A final step is that of determining a change in said inlet height of the U-tube fluid leg, which change is indicative of the presence of the contaminant in the stream. Again, it will be appreciated that the structure for carrying out such determination may vary widely, and it will depend upon the structure employed in the previous sensing step. In the illustrated arrangement, there is the alarm 41 which will be actuated when the pneumatic valve 36 has been actuated by the movement of float 32 so that the pneumatic pressure is applied to the alarm. The alarm then provides a determination of the change in inlet fluid level height of the U-tube, and consequently this step is carried out. Such change, of course, indicates the presence of the oil or other contaminant, and when the alarm is sounded some action can be taken to eliminate the source of the introduction of the contaminant.

It will be understood by anyone skilled in the art that the signal which actuates the alarm 41 could be used to control the shutdown of wells on the structure, or for other desired functions. This could be in addition to the sounding of the alarm.

OPERATION

The illustrated apparatus will operate as follows: When fluid that is flowing out through the pipe 15, or draining off from the deck 11, flows through the drain hole 16, it is carried down through the pipe 23 (and the inlet elbow 20) into the interior of the container 19. Thereafter, the fluid tends to flow up through the open bottom of the conduit 24 and out at the top of the column of fluid 29 that is formed in the conduit 24, via the elbow or outlet 25.

So long as the inlet leg fluid 28 has the same density as the fluid in the outlet leg 29, the fluid flowing in from the drain hole 16 (and connecting pipe) will assume the steady-state level equal to the level of the outlet leg 29 of the U-tube structure. However, whenever the inlet leg fluid 28 has a contaminating fluid (such as oil) included therein, it will seek a steady-state height that is above that of the discharge height (or level) of the outlet fluid leg 29. This is, of course, because the oil has a lesser density than water and it will therefore require a greater "head" of fluid in the inlet leg to equal or balance the head of the outlet fluid leg 29. Such increase in the level of fluid leg 28 is reflected by the float 32 which will rise and cause actuation of the valve 36 by reason of the connecting structure 33. Thus, the valve 36 will be shifted to permit pneumatic pressure to be transmitted through the valve to the connecting line 40, for actuating the alarm 41.

It may be noted that the preferable system is one where the container 19 has sufficient height to cause the density difference between inlet fluid leg 28 and outlet or discharge leg 29 to create a considerable displacement or difference in the fluid levels at the surface thereof. For example, a container height which would permit the length of inlet U-tube height to be 15 feet, would create the following conditions where the system was used over or in connection with salt water. Ten percent of oil (having a specific gravity of 0.85) in the inlet leg would cause a rise in the level of the float by five inches, if the specific gravity of the salt water is taken as 1.10. Thus, the sensitivity is increased by an increase in the height of the U-tube fluid legs.

It will be appreciated that the sensitivity, in terms of the total or absolute quantity of the contaminant in the inlet stream, might be improved by having a reduced cross-sectional area for the inlet fluid leg 28. This would mean, of course, that the percentage of contaminant in the inlet leg would be increased for a given quantity thereof.

It will be appreciated by anyone skilled in the art that the contaminating fluid might be one having a greater density than the body of water or other contaminated fluid. In such case the operation of the difference in levels between the inlet and outlet legs of the U-tube would be reversed. Thus, a presence of contaminants would cause the float 32 to go down, instead of up, upon introduction thereof.

While the foregoing embodiments of the invention have been described in considerable detail in accordance with the applicable statutes, this is not to be taken as in any way limiting the invention but merely as being illustrative thereof.

I claim:

1. A system for detecting the presence of a fluid contaminant in a stream said contaminant having a density different from that of the fluid in said stream when uncontaminated, comprising in combination
   U-tube means having an inlet leg and an outlet leg,
   means for connecting said stream to said inlet leg in order to permit equilibrium conditions,
   said outlet leg having a discharge level whereby said contaminant will change the level of said inlet leg fluid under said equilibrium conditions,
   float means actuated by and for detecting the level of the fluid in said inlet leg relative to said discharge level, and
   means actuated by said float means for indicating when the level of the fluid in said inlet leg is different from said discharge level.

2. A system according to claim 1, wherein said contaminant is oil and said uncontaminated stream is water.

3. A system according to claim 2, wherein said float-actuated means is a pneumatic control valve and includes an alarm to indicate when the level of the fluid in said inlet leg is different from said discharge level.

4. In combination with a structure located over or near a body of water, said structure including a deck upon which a contaminated fluid may gather, said contaminant having a different density than water, the combination of
   a U-tube having an inlet leg and an outlet leg,
   means for connecting drainage from said deck to said inlet leg in order to permit equilibrium conditions,
   said outlet leg having a predetermined discharge level whereby said contaminant will change the level of said inlet leg fluid under said equilibrium conditions, and
   means for determining when the level of the fluid in said inlet leg differs from said discharge level.

5. The invention according to claim 4 wherein said level-determining means comprises
   float means for monitoring the level of the fluid in said inlet leg, and
   means actuated by said float means for determining when said inlet leg fluid level varies.

6. The invention according to claim 5, wherein said float-actuated means comprises pneumatic valve means, and the combination further comprises
   pneumatic alarm means connected to said valve means.

7. In combination with petroleum product operations having a platform structure located over or near a body of water, said structure including a deck upon which oil may gather, and a drain for carrying off fluids from said deck, the combination of
   an elongated cylindrical container having a closed bottom and forming the inlet leg of a U-tube,
   a conduit within said container extending down near the bottom of and open for fluid connection with the fluid in said container,
   said conduit passing through a side wall of said container with a fluid-tight joint and forming the outlet leg of said U-tube,
   means for connecting said drain to said elongated container above said outlet joint,
   a float located in said container on the surface of the fluid in said inlet leg,
   a pneumatic valve,
   an alarm actuated by pneumatic control,
   means for supplying pneumatic pressure to said valve and connecting said alarm to said valve, and
   means for connecting said float to said valve for actuating same to cause actuation of said alarm whenever the steady-state fluid level in said container rises above the steady-state level from said outlet leg which indicates the presence of oil in the fluid draining from said deck.

* * * * *